July 12, 1932.  W. F. CURTIS  1,866,842
MACHINE TO SERVE ICE CREAM
Filed April 30, 1931   3 Sheets-Sheet 1
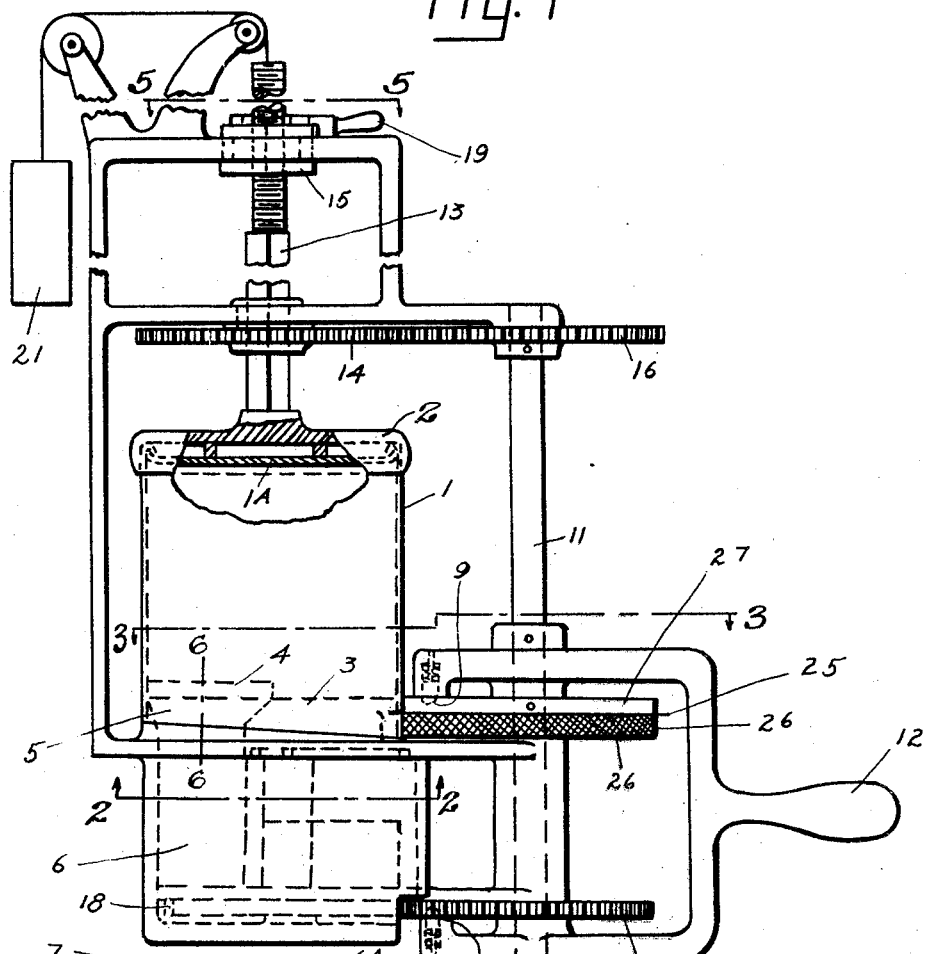
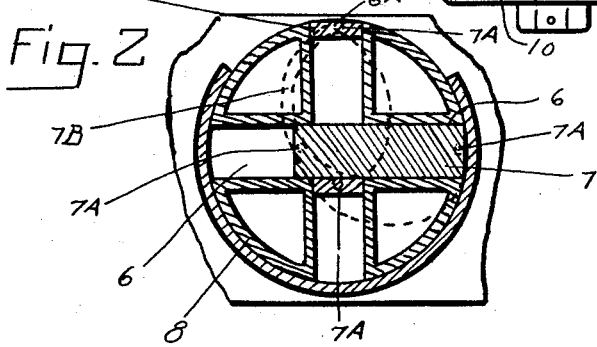
Winfred F. Curtis Inventor
By Charles W. Porett
Attorney July 12, 1932. W. F. CURTIS 1,866,842
MACHINE TO SERVE ICE CREAM
Filed April 30, 1931   3 Sheets-Sheet 2
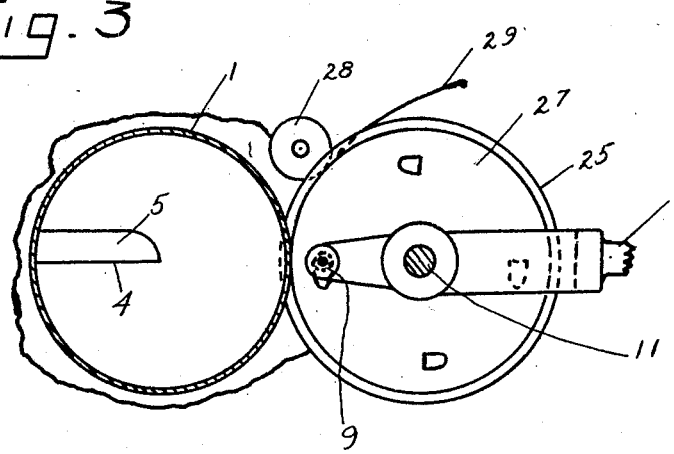
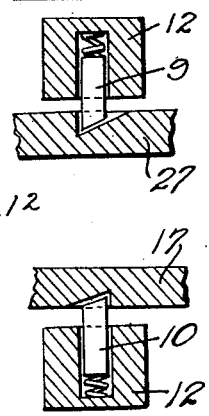
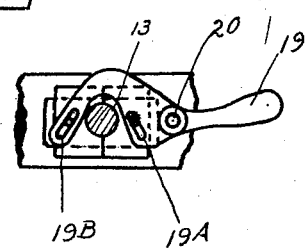
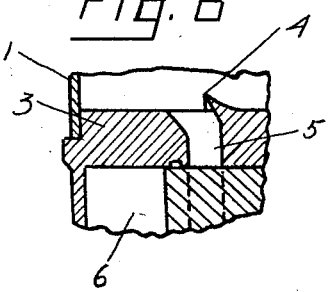
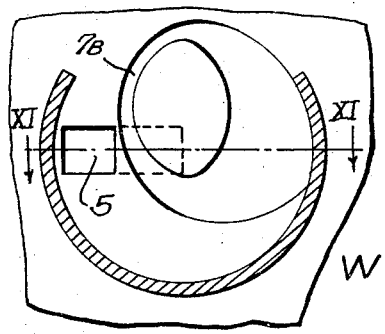
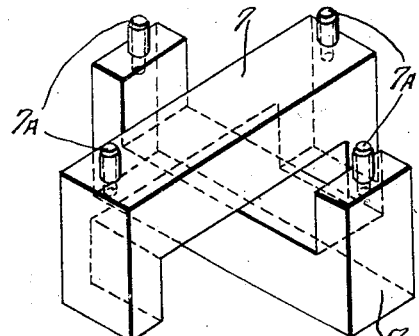
Winfred F. Curtis Inventor
By *Charles W. Lovett*
Attorney

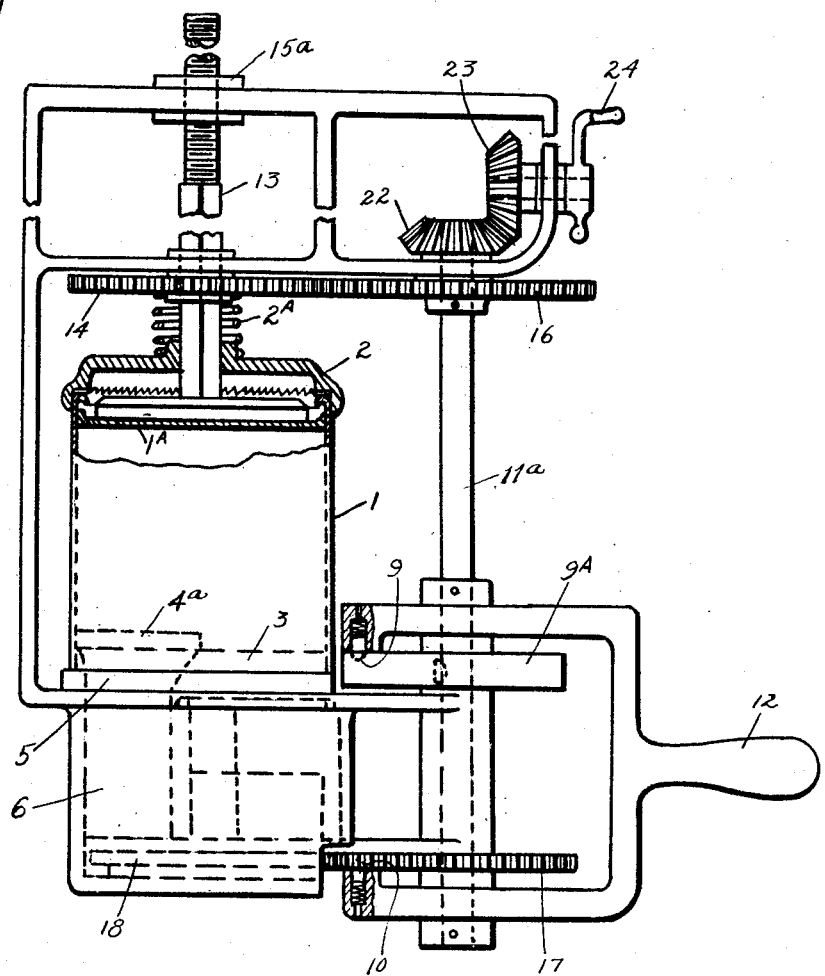

Patented July 12, 1932

1,866,842

UNITED STATES PATENT OFFICE

WINFRED F. CURTIS, OF SAUGUS, MASSACHUSETTS

MACHINE TO SERVE ICE CREAM

Application filed April 30, 1931. Serial No. 533,907.

The present invention relates to machines adapted to form ice cream or other similar material into portions of uniform size and deliver such portions into a receiving chamber.

The principal object of the invention is to avoid manual handling of the material and to thereby ensure a more sanitary service than has heretofore been available.

Another object of the invention is to provide a construction whereby equal portions of the material will be served, thereby avoiding both oversize and undersize portions.

Other objects and result will be made evident in the following specification.

The objects of the invention are accomplished as shown in the accompanying drawings which form a part of this specification and in which similar letters of reference refer to similar parts throughout the various views.

Figure 1 shows one model of the machine in which the container is spirally cut at its open end as said container is forced downwardly while the contents are delivered in uniform portions into the receiving chamber.

Figure 2 is a sectional view taken on line 2—2 of Figure 1,

Figure 3 is a partial section taken on line 3—3 of Figure 1,

Figure 4 is a modified form of the invention in which the loose bottom of the container is forced downwardly with the contents as pressure is applied, Figure 5 is a partial plan view of the split nut taken on line 5—5 of Figure 1, Figure 6 is a partial sectional view taken on line 6—6 of Figure 1 and showing the cutting mechanism for the material, Figure 7 is a view similar to Figure 2 with the turret removed and showing the cam mechanism.

Figure 8 is a partial sectional view showing one of the ratchets,

Figure 9 is a view of another ratchet,

Figure 10 is a perspective view of the ejecting mechanism, and

Figure 11 is a view taken on line 11—11 of Figure 7.

Referring again to the figures, there is disclosed a container 1 inclined on the top edge and having a bottom portion 1ª. The container is shown with its open end downward in the machine and is held in an upright position upon the machine through the medium of a clamp 2 having connection with a pressure screw 13, the purpose of which will be more fully disclosed hereafter.

For guiding the container 1 there is provided a guide member 3 over which the container is positioned as illustrated in Figure 6 of the drawings. The guide member 3 carries a knife edge 4 for use in cutting the contents within the container 1 and is also provided with an orifice 5 through which the contents pass after having been severed.

Positioned below the container 1 and guide member 3 is a measuring chamber 6 composed of a plurality of sections 6ª into which the portions are deposited. For forcing the portions from the measuring chamber there is provided a pair of ejectors 7 having cam rollers 7ª thereon adapted to pass in the cam path 7ᵇ. The construction of the cam and ejectors is fully disclosed in Figures 7 and 10. The ejectors are shown as being substantially U-shaped and crossing each other in a manner to permit the passing of the rollers 7ª in the cam path 7ᵇ. The ejector 7 is also disclosed in Figure 2 prior to the forcing out of the material. The cam rollers 7ª are disclosed as being on the upper surface of the ejectors since it is believed that their efficiency is greater than if they were positioned on the bottom surface thereof.

The measuring chambers are encased in a turret 8.

For rotating the container and measuring chambers there is shown an operating handle 12 of the configuration shown in Figure 1. The inner ends of the operating lever are constructed so as to receive a pair of ratchets 9 and 10, the purpose of which will be hereinafter described. Passing through the operating member 12 is a shaft 11 carrying a gear 16 adapted to mesh with a gear 14 for urging the pressure screw 13 downwardly into engagement with the container 1. For rotating the turret 8 there is provided a gear 17 meshing with a gear 18 which in turn is secured to the turret 8. The gear 17 is rotated by means of the ratchet 10 as illustrated in Figure 9 of the drawings. The ratchet 9 in turn, rotates the gears 16 and 14 through the shaft 11.

Mounted at the top of the machine is a split nut 15 which is provided with a cam lever 19 for opening and closing the same. The cam lever 19 has cam slots 19a and 19b therein and operates on a fulcrum point 20. It is not always necessary to use a split nut as any other type might be used which would securely fasten the pressure screw 13 to the frame. When the split nut 15 is open prior to using the machine, the weight 21 raises the clamp 2 to permit the entrance of the container over the container guide.

For spirally cutting the container as the contents are being severed, there is provided a rotary knife 25 positioned between a knurled roller 26 and ratchet wheel 27. The purpose of the knurled roller 26 is to aid in the cutting of the container since the cut-off part 29 (see Figure 3) will follow the knurled roller. The roller 28 is free-running and adjustable and is designed to hold the cut-off part of the container 29 against the roller 26 and to thereby produce a tension of the cut-off part so as to facilitate the turning and shearing of the container (see Figure 3). The ratchet wheel 27 is mounted on the shaft 11 and cooperates with the ratchet 9 in rotating the gears 14 and 16.

This machine is designed for electric refrigeration and is particularly adaptable for insertion in the top compartment of a three-compartment cabinet, in which the middle compartment is the smallest and only large enough to insert a plate to receive the individual portions as pushed out of the measuring chamber 6 by means of the ejector 7 as the revolving turret 8 brings the filled mold to the front or discharging position. The bottom compartment of the refrigerating cabinet is normally adaptable to contain the refrigerating mechanism and to receive the cut-off part of the container 29.

The operation of the machine disclosed in Figure 1 is as follows.

The filled container 1 is positioned over the container guide 3 with its open end down, the contents filling exactly against the knife 4, said contents having been frozen against a cover of the proper shape.

The split nut 15 having been opened, the clamp 2 is then lowered and held securely against the top or closed end of the container 1. The split nut 15 is then locked in its closed position through the medium of the cam lever 19.

The mechanism is then ready to operate and functions by pulling the handle 12 to the front or towards the container (as shown in Figure 1), 90° or to a stop thereby bringing the top ratchet 9 into operating engagement with the ratchet wheel 27 for urging the pressure screw 13 downward for turning the container. This motion being transmitted through the two gears 14 and 16, one of which has a square hole through a square end of the shaft 13 fits loosely. The turning of the container 1 is aided somewhat by the tension and pulling force on the cut-off strip 29 at the bottom, as said strip passes between the rolls 27 and 28. Said container is forced downwardly by the threaded end of the pressure screw 13 turning in the locked split nut 15 at a rate exactly the thickness of the slice cut by the knife 4 in the container guide 3. As the material and the container are forced downwardly the knife 4 is in a fixed position, the material is forced down upon the knife and rotated thereby cutting the material into slices of predetermined thickness. After being sliced the material passes through the opening 5 in the guide 3, thence into the receiving chamber 6, the receiving chamber and the ejectors therefor being in the position illustrated in Figure 2. The rotary motion of the container 1, the circular knife 25, cuts a strip 29 from the bottom end of the container. The function of the ratchet wheel and roll 27 together with the small adjustable loose roll 28, is to grip, pull, and direct away from the mechanism the spiral part 29 of the container 1 which has been cut off. The mold or measuring chamber 6 when first filled, is 90° from the front or discharging position shown in Figure 1.

The material is discharged or ejected from the chamber 6 in the following manner. The handle 12 is pushed back to its starting position and during this backward movement of the handle, the top ratchet does not engage the ratchet wheel 27 thereby preventing movement of the container 1 or the circular knife 25. The bottom ratchet 10 however, engages and through the gears 17 and 18 causes the turret 8 to rotate 90°. This rotation of the turret 8 shears the contents between the top of the turret and the bottom of container guide 3 and brings the filled receiving chamber 6 to the front, where the measured portion is ejected by the ejector 7. The last described movement of the turret 8 also positions another receiving chamber 6 beneath the opening 5 in the container guide 3 for filling. Attention is directed to Figures 7 and 10 for determining the path followed by the specially designed ejectors 7. As previously mentioned, the ejectors 7 are provided with cam rollers 7a which fit within the cam groove 7b. Thus as one ejector moves in the cam path 7b for ejecting the material out of the chamber 6 after it has been rotated 90°, the ejector also moving 90°, the other ejector swings into position adjacent the next receiving chamber 6 which is positioned beneath the opening 5 in the container guide 3.

During the repositioning of the chamber 6, while the contents of a filled chamber is being delivered to the spot 6ª and another chamber moved into position below the orifice 5 for filling, said orifice is closed by that portion of the top surface of the turret between the respective chambers, the edge of which surface portion in its rotary motion serves the previously discharged material within the filled chamber from the material within the container.

Referring to Figure 4 there is disclosed a modified form of the invention, the main principle of which is substantially the same as in the preferred form. In this figure there is used a solid nut 15ª in place of the split nut 15, and the provision of serrated edges 2ᵇ on clamp 2 for effectively holding the metal container 1ᵇ in position. The spring 2ª encircles the pressure screw 13 and is positioned between the gear 14 and clamp 2 for normally maintaining the clamp 2 in position. The principal difference between the modified form and the preferred form is the means for raising and lowering the clamp 2. In this form there is disclosed a pair of bevelled gears 22 and 23. The bevelled gear 22 is mounted for rotation on the shaft 11ª. For rotating the gears 22 and 23 there is provided a handle 24 directly connected through a shaft to the gear 23. It will thus be seen that rotation of the handle 24 causes gear 23 to mesh with gear 22 thereby rotating shaft 11 which in turn rotates gear 16 and causes the same to mesh with gear 14 for raising and lowering the pressure screw 13. Thus it will be seen that the handle 24 through the medium of the gears above mentioned quickly raises and lowers the pressure screw 13 until the plunger contacts with the bottom 1ª, whereupon the handle 12 is caused to rotate the pressure screw intermittently.

In place of the paper or like container used in the preferred form there is provided a container 1ᵇ of metal or the like having a slidable end 1ª. Thus as the container is rotated the slidable end 1ª is urged downwardly within the container for forcing the material into engagement with the knife 4ª for severing the said material into slices of predetermined thickness. The means and method for rotating the container and the turret is the same as illustrated in the preferred form.

Some changes may be made in the construction and arrangement of the invention above set forth, without departing from the real purpose and spirit thereof, and it is the intention to cover by the following claims, any modified form of structure or use of equivalents, which may be reasonably included within their scope.

Having thus described my invention I claim as new and desire to secure by Letters Patent of the United States of America.

1. A machine for serving ice cream, or similar material, comprising means for holding a container of said material, and having a discharge outlet, means for discharging said material through said outlet, means for severing said material with uniform portions as they are discharged through said outlet, and means for removing portions of said container as said material is discharged, all substantially as described.

2. In a machine for serving ice cream or like material provided with a discharge outlet, the combination of means for holding the container of said material, means for rotating the container upon its axis and gradually imparting longitudinal motion thereto so as to discharge said material through said outlet, means for removing portions of the sides of said container to allow its further downward longitudinal motion, a turret movable transversely of said outlet having therein a series of chambers adaptable to receive said material as discharged through said outlet, means for moving said turret across the mouth of said outlet, so as to sever the previously discharged material, and to bring said turret into the next operative position opposite said outlet, and means acting at one limit of the turret's movements to eject said material from said chambers, all substantially as described.

3. In a machine for serving ice cream or like material provided with a discharge outlet, the combination of a receptacle for the material mounted upon a suitable framework adaptable to be secured within a refrigerating chamber, means for rotating the container upon its axis and gradually imparting longitudinal motion thereto so as to discharge said material through said outlet, means for removing portions of the sides of said container to allow its further downward longitudinal motion, a turret movable transversely of said outlet having therein a series of chambers adaptable to receive said material as discharged through said outlet, means for moving said turret across the mouth of said outlet so as to sever the previously discharged material and to bring said turret into the next operative position opposite said outlet, and means acting at one limit of the turret's movements to eject said material from said chambers, all substantially as described.

4. In a machine for serving ice cream or like material, provided with a discharge outlet, the combination with a receptacle for the material, of chambers adaptable to receive said material as discharged through said outlet, means for discharging said material through said outlet, means for severing the material from that remaining in the receptacle, means for discharging said material from said chambers, and means for removing portons of the sides of the receptacle as the contents therein are discharged, all substantially as described.

5. A machine of the class described comprising means for holding a container of plastic material including a clamp removably associated with the top of said container and a plate including a guide for the bottom of said container, a discharge opening through said plate, cutting means carried by said plate adjacent said opening and means whereby the container is rotated on the guide and the material severed by the cutting means and forced through the opening.

6. A machine of the character described comprising means for holding a container of plastic material having a discharge opening including a clamp removably associated with the top portion of said container and a plate including a guide for the bottom of said container, a shaft carried by said clamp, a gear carried by said shaft, a discharge opening through said plate, cutting means carried by said plate adjacent said opening and means for operating said gear whereby the container is rotated on the guide and the material severed by the cutting means and forced through the opening.

7. A machine of the character described comprising means for holding a container of plastic material including a clamp removably associated with the top of said container and a plate including a guide for the bottom of said container, a measuring chamber disposed beneath said plate, ejecting means in communication with said measuring chamber and means whereby the container is rotated on the guide and the material cut off and forced into the measuring chamber.

8. A machine of the character described comprising means for holding a container of plastic material including a clamp removably associated with the top of said container and a plate including a guide for the bottom of said container, cutting means carried by said guide, a measuring chamber disposed beneath said plate, a turret encircling and attached to said measuring chamber and means whereby the container and turret is rotated and the material cut off and forced into the measuring chamber.

9. A machine of the character described comprising means for holding a container of plastic material including a clamp removably associated with the top of said container and a plate including a guide for the bottom of said container, cutting means carried by said plate, measuring chambers disposed beneath said plate, ejecting means in communication with said measuring chambers, a turret encircling and attached to said measuring chambers, a gear associated with said turret and means for rotating said gear and said clamp whereby the container is rotated and the material is cut off and forced into the measuring chambers.

In testimony whereof I affix my signature.

WINFRED F. CURTIS.